(12) United States Patent
King (10) Patent No.: US 10,457,195 B1
(45) Date of Patent: Oct. 29, 2019

(54) ADJUSTABLE LIGHTING APPARATUS FOR USE WITH VEHICLES

(71) Applicant: Valeo North America, Inc., Troy, MI (US)

(72) Inventor: Robert King, Seymour, IN (US)

(73) Assignee: VALEO NORTH AMERICA, INC., Troy, MI (US)

( * ) Notice: Subject to any disclaimer, the term of this patent is extended or adjusted under 35 U.S.C. 154(b) by 0 days.

(21) Appl. No.: 16/050,886

(22) Filed: Jul. 31, 2018

(51) Int. Cl.
*B60Q 1/14* (2006.01)

(52) U.S. Cl.
CPC ........ *B60Q 1/1469* (2013.01); *B60Q 2200/36* (2013.01)

(58) Field of Classification Search
CPC .......................... B60Q 1/1469; B60Q 2200/36
See application file for complete search history.

(56) References Cited

U.S. PATENT DOCUMENTS

| 3,316,397 | A | * | 4/1967 | Yssel | B60Q 1/10 362/468 |
| 5,906,431 | A | * | 5/1999 | Chianale | B60Q 1/0686 362/273 |
| 9,120,422 | B2 | * | 9/2015 | King | B60Q 1/0683 |
| 2014/0029288 | A1 | | 1/2014 | King | |
| 2016/0159271 | A1 | * | 6/2016 | Helwig | B60Q 1/08 362/463 |

* cited by examiner

*Primary Examiner* — Donald L Raleigh
(74) *Attorney, Agent, or Firm* — Oblon, McClelland, Maier & Neustadt, L.L.P.

(57) ABSTRACT

Adjustable lighting apparatus for use with vehicles are disclosed. A disclosed apparatus includes a vehicle lighting assembly. The vehicle lighting assembly includes a plurality of optical systems each configured to output respective light beams. The vehicle lighting assembly also includes a primary adjustment part movable along a first axis. The vehicle lighting assembly also includes a plurality of levers each operatively coupled to (a) the primary adjustment part and (b) a respective one of the optical systems. The vehicle lighting assembly also includes a plurality of lever pivot points corresponding to respective ones of the plurality of levers. Movement of the adjustment part along the first axis results in cooperative movement of the plurality of optical systems.

18 Claims, 7 Drawing Sheets

ADJUSTABLE LIGHTING APPARATUS FOR USE WITH VEHICLES

FIELD OF THE DISCLOSURE

This disclosure relates generally to vehicle lighting and, more particularly, to adjustable lighting apparatus for use with vehicles.

BACKGROUND

Motor vehicles typically have lighting devices for both interior and exterior illumination. Some vehicles employ headlamp leveling systems that are capable of controlling lighting components (e.g., via an actuator) to aim light beams emitted out of a vehicle lamp. Such systems prevent the light beams from disturbing other drivers or oncoming traffic, which improves vehicle safety.

SUMMARY

An aspect of the present disclosure includes a vehicle lighting assembly. The vehicle lighting assembly includes a plurality of optical systems each configured to output respective light beams. The vehicle lighting assembly also includes a primary adjustment part movable along a first axis. The vehicle lighting assembly also includes a plurality of levers each operatively coupled to (a) the primary adjustment part and (b) a respective one of the optical systems. The vehicle lighting assembly also includes a plurality of lever pivot points corresponding to respective ones of the plurality of levers. Movement of the adjustment part along the first axis results in cooperative movement of the plurality of optical systems.

In a further aspect of the present disclosure, the vehicle lighting assembly includes a tuning system configured to adjust one of the plurality of optical systems relative to a respective one of the plurality of levers.

In a further aspect of the present disclosure, the tuning system includes a slot disposed in the housing. The one of the plurality of optical systems has a portion that is movable in the slot.

In a further aspect of the present disclosure, the slot has a shape that is curved.

In a further aspect of the present disclosure, the plurality of optical systems includes respective reflectors. At least two of the reflectors are positioned along a same horizontal axis.

In a further aspect of the present disclosure, the two of the reflectors pivot relative to the same horizontal axis.

In a further aspect of the present disclosure, the vehicle lighting assembly includes a joint formed by the primary adjustment part and at least two levers of the plurality of levers.

In a further aspect of the present disclosure, the joint includes an aperture extending through a portion of the primary adjustment part and portions of the respective two levers to receive means for movably coupling the primary adjustment part to the two levers.

Another aspect of the present disclosure includes an apparatus. The apparatus includes a housing for a vehicle lamp. The apparatus also includes a reflector pivotably coupled to the housing. The apparatus also includes a shaft extending through the housing to engage a lever that is operatively interposed between the reflector and the shaft. The lever is pivotable relative to a pivot point positioned between the reflector and the shaft. The shaft moves into or out of the housing to cause the lever to move the reflector.

In a further aspect of the present disclosure, a distance between the pivot point and the reflector is less than a distance between the pivot point and the shaft.

In a further aspect of the present disclosure, the lever includes a receptacle to be received by a protrusion positioned in the housing that defines the pivot point. The lever is to pivot relative to the protrusion between raised and lowered positions.

In a further aspect of the present disclosure, the receptacle has a shape that is tapered.

In a further aspect of the present disclosure, the reflector is a first reflector and the lever is a first lever. The apparatus also includes a second reflector pivotably coupled to the housing. The shaft is to engage a second lever that is operatively interposed between the second reflector and the shaft to enable the second lever to move the second reflector cooperatively with the first reflector.

In a further aspect of the present disclosure, the apparatus also includes means for adjusting an orientation of one of the first or second reflector relative to the other one of first or second reflector.

In a further aspect of the present disclosure, the apparatus also includes a joint formed by the first lever and the first reflector.

In a further aspect of the present disclosure, the joint includes an aperture that extends through a portion of the first reflector to receive a portion of the first lever.

Another aspect of the present disclosure includes a vehicle. The vehicle includes a lamp to emit a light. The vehicle also includes means for directing the light disposed in the lamp to direct the light. The vehicle also includes a lever movably coupled to the means for directing the light to control a position thereof. The vehicle also includes means for moving the lever to cause (a) the lever to pivot relative to a first axis and (b) the means for directing the light to pivot relative to a second axis that is different from the first axis.

In a further aspect of the present disclosure, the first axis is substantially perpendicular relative to the second axis.

In a further aspect of the present disclosure, the vehicle also includes means for adjusting the second axis.

In a further aspect of the present disclosure, the means for directing the light is a first means for directing the light and the lever is a first lever. The vehicle also includes second means for directing the light and a second lever coupled thereto to control a position thereof. The means for moving is to cause the first and second means for directing the light to simultaneously pivot relative to the first axis.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

The figures are not to scale. In general, the same reference numbers will be used throughout the drawing(s) and accompanying written description to refer to the same or like parts.

DETAILED DESCRIPTION

Some known vehicle lighting systems have beam leveling functionality that aim light beams of a headlamp (sometimes referred to as a headlight) during certain driving conditions. For example, when a vehicle is carrying a heavy load or driving on an uneven surface, the front of the vehicle may tilt upward. As a result, the vehicle headlamps may distract and/or dazzle other drivers near the vehicle. To correct for this, some known vehicle lighting systems employ sensors and controllers to detect such driving conditions and, in response, control (e.g., via actuators and/or motors) components in the headlamp to change a direction or angle of the beams. Sometimes, these lighting systems change the beam angles in response to driver input to a steering wheel or a turn signal switch, which helps the driver see around a corner.

Typically, to aim a light beam, some known vehicle lighting systems have multiple slider block assemblies in the headlamp that are carried by significantly large and/or heavy brackets. Additionally, a housing of the headlamp may be particularly molded to allow such assemblies to properly move. However, such known vehicle lighting systems may incur substantial costs due to these assemblies and/or unique moldings of the headlamp.

Some other known vehicle lighting systems have types of rotary actuators that are driven by rotating, threaded shafts in the housing to move rocker arms that carry lighting components. However, these known systems are limited to vertical arrangements of the lighting components along the shaft, which may not be suitable for some vehicle lamp architectures.

Adjustable lighting apparatus for use with vehicles are disclosed. Examples disclosed herein enable positional control of one or more optical systems of a vehicle lamp (e.g., a headlamp) that output light (e.g., one or more light beams) from the lamp, which improves vehicle safety by preventing the light from dazzling other drivers. In particular, disclosed examples provide a primary adjustment part (e.g., a rod or shaft) that extends through a housing of the lamp to receive one or more arms or levers, each of which extends between the adjustment part and a disclosed optical system to operatively couple the adjustment part to the optical system. A pivot point is provided within the housing for each lever to facilitate movement of its associated optical system. As such, when the disclosed adjustment part moves into or out of the housing (e.g., via a motor and/or an actuator), the levers pivot relative to the respective pivot points, thereby moving the optical systems cooperatively. In this manner, multiple light beams (e.g., 2, 3, 4, etc.) can be aimed simultaneously via movement of a single adjustment part. As a result, disclosed examples reduce costs that are associated with the above-mentioned known vehicle lighting systems by reducing part weight and/or complexity. Further, disclosed examples enable advantageous arrangements (e.g., a horizontal arrangement) of the disclosed optical systems that would have been otherwise unattainable.

Additionally, some disclosed examples provide one or more tuning systems to enable independent tuning of a disclosed optical system (e.g., prior to aiming the light beams via the adjustment part). In particular, a disclosed tuning system enables the optical system to change orientation relative to its associated lever and/or another optical system. In this manner, multiple optical systems can be tuned and/or otherwise adjusted relative to each other such that the light beams output thereby are directed in substantially the same direction (i.e., the light beams are substantially parallel).

Figure 1:
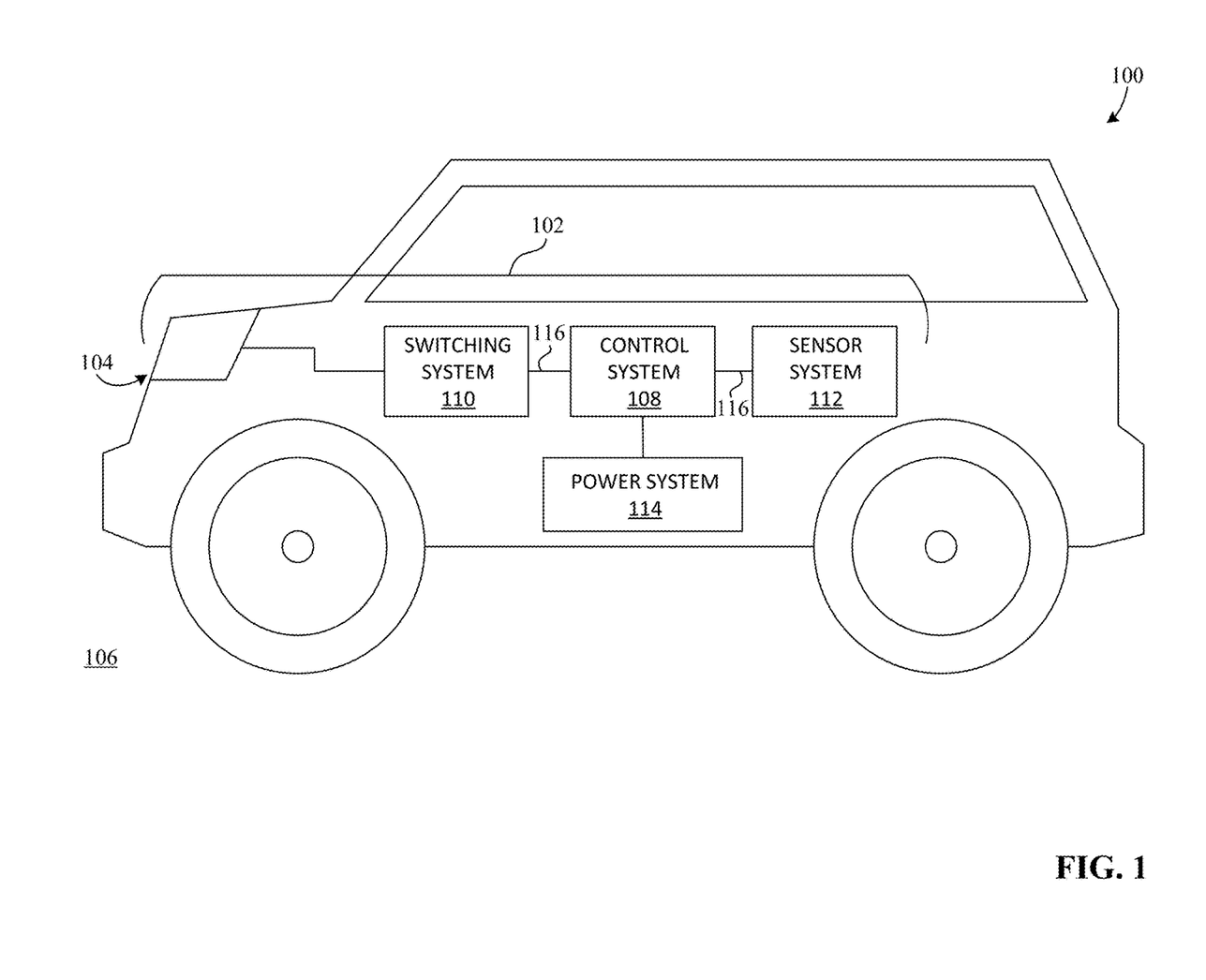
FIG. 1 is a schematic illustration of an example vehicle in which examples disclosed herein can be implemented.

FIG. 1 is a schematic illustration of an example vehicle (e.g., a car, a van, a truck, a sport utility vehicle (SUV), etc.) 100 in which examples disclosed herein can be implemented. According to the illustrated example of FIG. 1, the vehicle 100 includes an example lighting system 102 having one or more example lighting devices 104 (one of which is shown in this example) such as, for example, one or more headlamps, one or more side markers, one or more tail lamps (sometimes referred to as tail lights), etc. In particular, the lighting device(s) 104 of FIG. 1 generate light and emit the light away from the vehicle 100, for example, to illuminate an example driving surface (e.g., concrete, asphalt, dirt, etc.) 106 and/or provide visual indication(s) to another vehicle and/or a pedestrian. Although FIG. 1 depicts the vehicle 100 as having a single headlamp, in other examples, the vehicle 100 may be implemented differently (e.g., with one or more additional and/or different lighting devices).

In some examples, to control the lighting device(s) 104, the lighting system 102 includes one or more electrical components, as discussed further below. In particular, as shown in FIG. 1, the lighting system 102 includes an example control system 108, an example switching system 110, an example sensor system 112, and an example power system 114. More generally, the lighting system 102 controls the lighting device(s) 104 to enable one or more lighting functions such as, for example, powering the lighting device (s) 104 on or off, increasing or decreasing power provided to the lighting device(s) 104, and/or changing a direction of the light emitted from the lighting device(s) 104.

Such control of the lighting device(s) 104 may occur in response to one or more detected driving conditions associated with the vehicle 100 that may indicate the light is aimed improperly. In some examples, in response to detecting such a condition, the control system 110 controls, via the switching system 112, the lighting device(s) 104 to change a direction of the light. For example, the lighting system 102 detects, via the sensor system 112, when the vehicle 100 is tilted and/or the driving surface 106 is non-uniform, which may result in the light dazzling another driver.

The control system 110 of FIG. 1 includes one or more embedded systems, processors, electronic control units (ECUs) and/or microcontrollers, which may be dedicated to a specific region and/or function of the vehicle 100. For example, an ECU may provide memory and control logic functions for several dumb devices, such as a passive sensor and/or switch. Typically, numerous ECUs having different embedded software may be found in a single automobile and may communicate via internal vehicle networks such as a Controller Area Network (CAN).

The sensor system 114 of FIG. 1 includes one or more sensors to detect various conditions within the vehicle 100 and/or in the vicinity of the vehicle 100. For example, the sensor system may include one or more of a temperature sensor, a photosensor, a position sensors, a speed sensor, an angle sensor, a leveling sensor, and/or any other sensor for detecting a diagnostic, a parameter of the vehicle 100, and/or an ambient environment associated with the vehicle 100. Such sensor(s) may be passive or "dumb" type of sensor that provides a voltage representative of the sensed parameter or a so called "smart" type of sensor having integrated memory and processing capability to analyze a parameter sensed within the sensor itself. In some examples, the sensor system 114 includes a steering wheel angle sensor that provides a signal for initiating a lighting function such as, for example, a static bending light function.

The switching system 112 of FIG. 1 includes one or more electrical switches, mechanical switches, and/or actuators for activating a lighting function of the vehicle 100. For example, the switching system 112 may include one or more transistors as discrete components or within an integrated circuit, which interrupt or pass current to a light source such as a light-emitting diode (LED) in accordance with lighting function requirements. Mechanical switches may be manually operated by a driver or automatically activated by actuators in response to a control signal, for example. A manually operated switch may initiate one or more vehicle lighting or signaling functions. For example, a user manually operating a turn signal switch may initiate a turn signal function as well as a static bending light function. Actuators generally cause movement and may include hydraulic actuators, pneumatic actuators or electrical/electronic actuators such as a stepper motor. Actuators may also be "dumb" devices that react to a simple analog voltage input, or "smart" devices with built-in memory and processing capability. Accordingly, in some examples, one or more components (e.g., a motor and/or an actuator) of the switching system 112 are operatively coupled to the lighting device(s) 104 of the vehicle 100.

The switch(es) of the switching system 112 may be activated based on a sensed parameter from the sensor(s) of the sensor system 114. Thus, the switching system 112 and sensor system 114 may be connected in a feedback control loop for diagnostic detection and control of the vehicle lighting system 102 and its lighting devices. As such, in some examples, the switching system 112 is communicatively coupled to the sensor system 114 as well as the control system 110 via communication link(s) (e.g., a signal or transmission wire, a bus, radio frequency, etc.) 116.

The power system 108 of FIG. 1 includes one or more of a battery, an alternator, and/or other device(s) that provide electrical power for the electrical component(s) and/or electronic device(s) of the vehicle 100.

Figure 2:
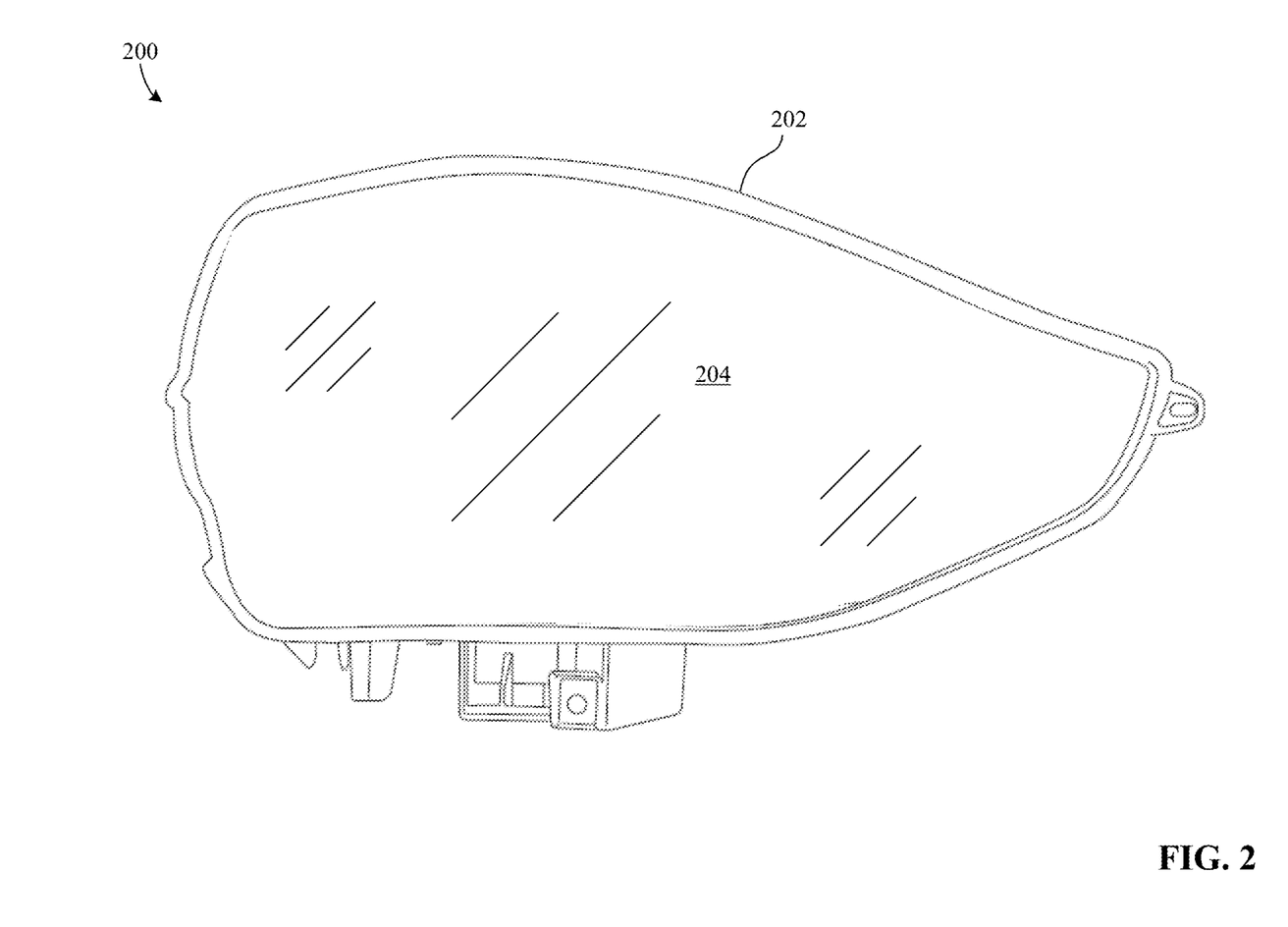
FIG. 2 is a detailed view of an example lamp in which examples disclosed herein can be implemented.

FIG. 2 is a detailed view of an example lighting device (e.g., a headlamp) 200 in which examples disclosed herein can be implemented. In some examples, the lighting device 200 of FIG. 2 corresponds to one or more of the aforementioned lighting device(s) 104 depicted in FIG. 1. As seen, the lighting device 200 includes an example housing 202 for containing components of the lighting device 200. For example, such components may include mechanical components (e.g., one or more mounting brackets), aesthetic components (e.g., one or more bezels), optical components (e.g., one or more reflectors and/or one or more lenses), and/or electrical components (e.g., one or more light sources and/or power circuits).

The lighting device 200 of FIG. 2 includes an example cover or lens 204 that at least partially encloses the components within the housing 202. In particular, the lens 204 is coupled (e.g., removably coupled) to the housing 202 and enables light to pass therethrough.

Figure 3:
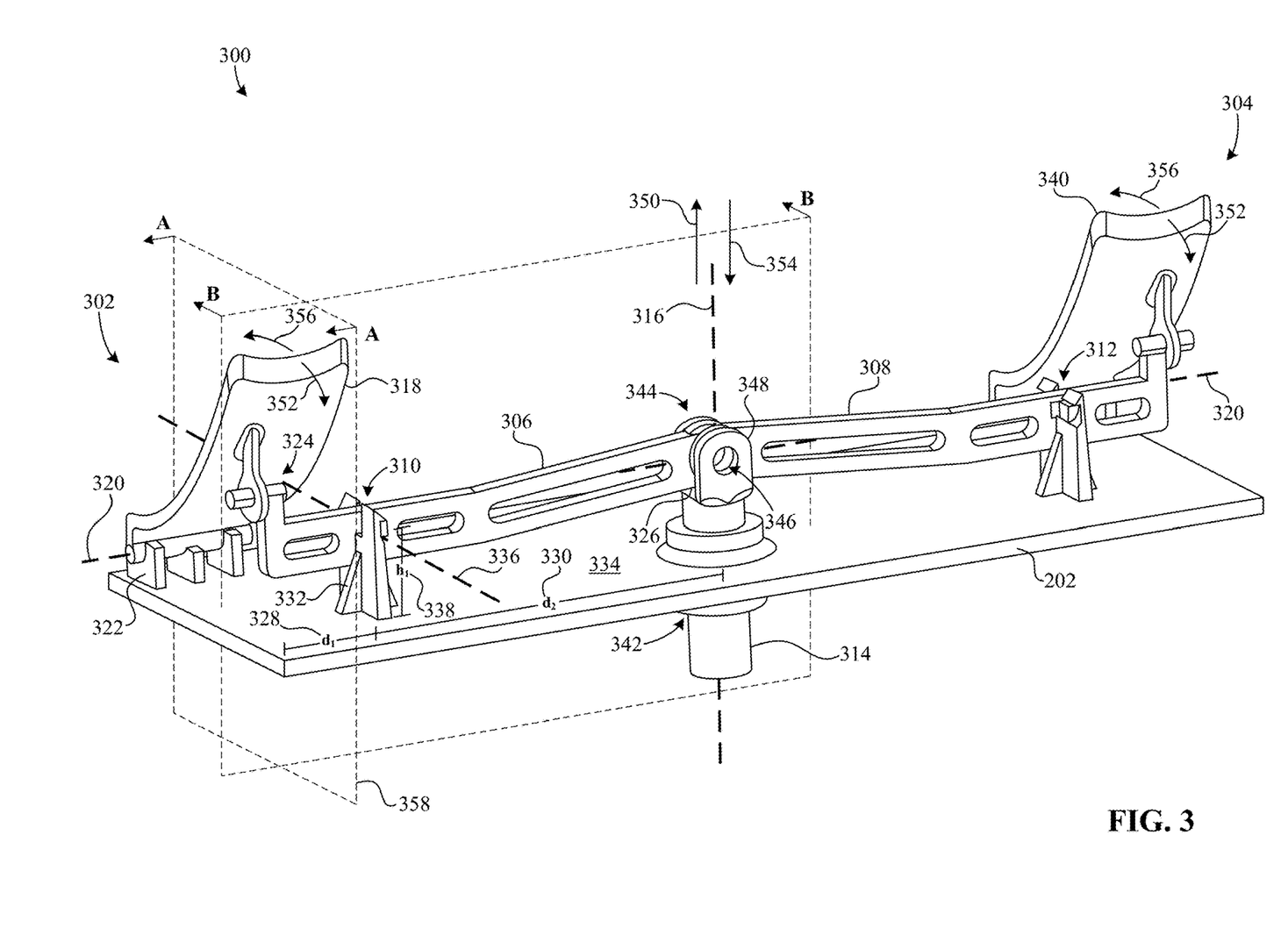
FIG. 3 is a detailed view of a vehicle lighting assembly in accordance with the teachings of this disclosure.

FIG. 3 is a detailed view of an example vehicle lighting assembly 300 in accordance with the teachings of this disclosure. In some examples, the lighting assembly 300 is implemented in one or more of the lighting device(s) 104 of FIG. 1 and/or the lighting device 200 of FIG. 2. According to the illustrated example of FIG. 3, the lighting assembly 300 includes one or more example optical systems 302, 304, two of which are shown in this example (i.e., a first optical system 302 and a second optical system 304). Each optical system is 302, 304 is configured to output a respective light beam, for example, via a light source (e.g., an LED, a light bulb, etc.), a reflector, and/or a lens (e.g., a converging lens), as discussed further below. Accordingly, in some examples, an optical system 302, 304 of the vehicle lighting assembly 300 includes one or more light sources, one or more reflectors, and/or one or more lenses capable of directing light.

The lighting assembly 300 of FIG. 3 also includes one or more example arms or levers 306, 308, each of which is operatively coupled to a respective one of the optical system(s) 302, 304. The lever(s) 306, 308 are associated with respective pivot points 310, 312 to provide leverage. In particular, the lever(s) 306, 308 enable movement of the respective optical system(s) 302, 304 and, as a result, enable the light beam(s) to change direction. To facilitate such movement, the lighting assembly 300 includes a primary adjustment part 314 that is operatively coupled to each lever 306, 308. The adjustment part 314 is movable along an axis 316 thereof (i.e., a first axis 316), thereby moving the optical system(s) 302, 304 in a cooperative manner. Additionally, in some examples, the adjustment part 314 is configured to adjust one or more other optical systems of the vehicle lighting assembly 300 in addition or alternatively to the optical system(s) 302, 304 depicted in FIG. 3.

In some examples, as shown in FIG. 3, the first optical system 302 includes a first example reflector 318 that is pivotably coupled to at least a portion of the housing 202. That is, the first reflector 318 is coupled to the housing 202 directly or via one or more components interposed between the first reflector 318 and the housing 202. In particular, the first reflector 318 is configured to change orientation and/or move relative to the housing 202, thereby aiming a light beam received by the first reflector 318. For example, the first reflector 318 pivots relative to a second axis 320 that is defined by a first example adaptor 322 coupled between the first reflector 318 and the housing 202. Accordingly, the first reflector 318 is pivotably coupled to the first adapter 322, and the first adapter 322 is fixedly coupled to the housing 202. Additionally or alternatively, in other examples, the first reflector 318 is adjustably coupled to the housing 202 via an example tuning system 500 (shown in FIGS. 5A and 5B) to enable independent tuning of the first reflector 318, which is discussed further below in connection with FIGS. 5A and 5B. In such examples, the tuning system 500 enables a position of the second axis 320 to move.

To facilitate movement of the first reflector 318 via the adjustment part 314, the first lever 306 is movably coupled to the first reflector 318 via a first example joint 324 that is interposed between and/or formed by the first reflector 318 and the first lever 306. The first lever 306 extends away from the first joint 324 to be received by the primary adjustment part 314. In particular, the primary adjustment part 314 imparts a force on a portion (e.g., an end) 326 of the first lever 306, thereby causing the first lever 306 to pivot relative to the first pivot point 310. Movement of the adjustment part 314 along the axis 316 may be provided by, for example, an actuator and/or a motor associated with the lighting system 102.

As shown in FIG. 3, the first pivot point 310 is positioned such that: (1) a first distance 328 is defined between the first pivot point 310 and the first reflector 318; and (2) a second distance 330 is defined between the first pivot point 310 and the adjustment part 314. In this example, the first pivot point 310 is positioned such that the first distance 328 is less than the second distance 330 such that sufficient leverage is provided to the first lever 306 that enables the adjustment part 314 to effectively move the first reflector 318 through a range of motion. However, the first distance 328 may be the same or greater than the second distance 330.

As shown in FIG. 3, the first pivot point 310 is provided by a first fulcrum or protrusion 332 that extends away form a surface 334 of the housing 202 to receive a portion of the first lever 306. In particular, the first protrusion 332 enables the first lever 306 to pivot relative to a third axis 336. The first protrusion 332 has a height 338 that is sufficient to allow the first lever 306 to move without interfering with and/or engaging the surface 334 of the housing 202 and/or component(s) associated with the housing 202. According to the illustrated example of FIG. 3, the second axis 320 is substantially perpendicular relative to the third axis 336. As used herein, the term "substantially perpendicular" refers to an angle formed by the second axis 320 and third axis 336 that is between about 75 degrees and about 105 degrees. Additionally, in some examples, to limit movement of the first reflector 318 and/or the first lever 306, the first lever 306 and/or a component associated therewith engages at least a portion of the first protrusion 332, as discussed in greater detail below in connection with FIGS. 6A and 6B.

Although aspects have been disclosed that are associated with the first optical system 302, such aspects likewise apply to the second optical system 304. For example, as shown in FIG. 3, the second optical system 304 similarly includes a second example reflector 340 that is pivotably coupled to the housing 202 and operatively coupled to the adjustment part 314 via the second lever 308 to control a light beam received by the second reflector 340.

As shown in FIG. 3, the reflectors 318, 340 are horizontally aligned and/or arranged relative to each other. That is, at least a portion of the first reflector 318 and at least a portion of the second reflector 340 are positioned on the same horizontal axis (e.g., the second axis 320). Further, in some examples, the first and second reflectors 318, 340 pivot relative to the same horizontal axis (e.g., the second axis 320). In the illustrated example of FIG. 3, the first and second reflectors 318, 340 are considered to be properly tuned relative to each other. As a result, the light beam output by the first reflector 318 is substantially parallel relative to the light beam output by the second reflector 340.

In the illustrated example of FIG. 3, the adjustment part 314 extends through a first example aperture 342 disposed on the housing 202 to receive the first lever 306, the second lever 308, and/or one or more other levers associated with the lighting assembly 300. The adjustment part 314 is movably coupled to the lever(s) 306, 308 via a second or primary joint 344 that is interposed between and/or formed by the adjustment part and the levers 306 308, which facilitates movement therebetween.

In some examples, the second joint 344 of FIG. 3 includes a second example aperture 346 that extends through the adjustment part 314 and the levers 306, 308 to receive one or more fasteners (e.g., one or a pin, a screw, a nut, etc.) for movably coupling the adjustment part 314 to the levers 306, 308. However, in other examples, the adjustment part 314 and the levers 306, 308 may be coupled together via one or more other suitable structures and/or techniques (e.g., snap-fitting) to similarly enable such movement. For example, a portion of the of the adjustment part 314 may extend into and engage portions of the respective levers 306, 308. Conversely, portions of the respective levers 306, 308 may extend into and engage a portion of the adjustment part 314.

In some examples, as shown in FIG. 3, the levers 306, 308 are interposed between an example yoke 348 of the adjustment part 314 that carries the levers 306, 308. Although FIG. 3 depicts the adjustment part 314 as a rod or shaft having the yoke 348, in other examples, the adjustment part 314 may be implemented using one or more other suitable structures having sufficient strength and/or rigidity to impart a force on and/or control movement of the lever(s) 306, 308.

As previously mentioned, to pivot the reflectors 318, 340 about the second axis 320, the adjustment part 314 moves along the first axis 316 to cause the lever(s) 306, 308 to pivot about the respective pivot points 310, 312. More particularly, when the adjustment part 314 moves into the housing 314 along the first axis 316 in a first linear direction 350, the reflectors 318, 340 rotate in a first rotational direction (e.g., clockwise) 352. Conversely, when the adjustment part 314 moves out of the housing 314 along the first axis 316 in a second linear direction 354 opposite the first linear direction 350, the reflectors 318, 340 rotate in a second rotational direction (e.g., counterclockwise) 356 opposite the first rotational direction 352.

In some examples, the light beams provided by the respective reflectors 318, 340 are vertically aimed. That is, the reflectors 318, 340 rotate along a substantially vertical plane 358, as shown in FIG. 3. The plane 358 of FIG. 3 is substantially perpendicular relative to the second axis 320 and/or substantially parallel relative to the third axis 336.

Figure 4:
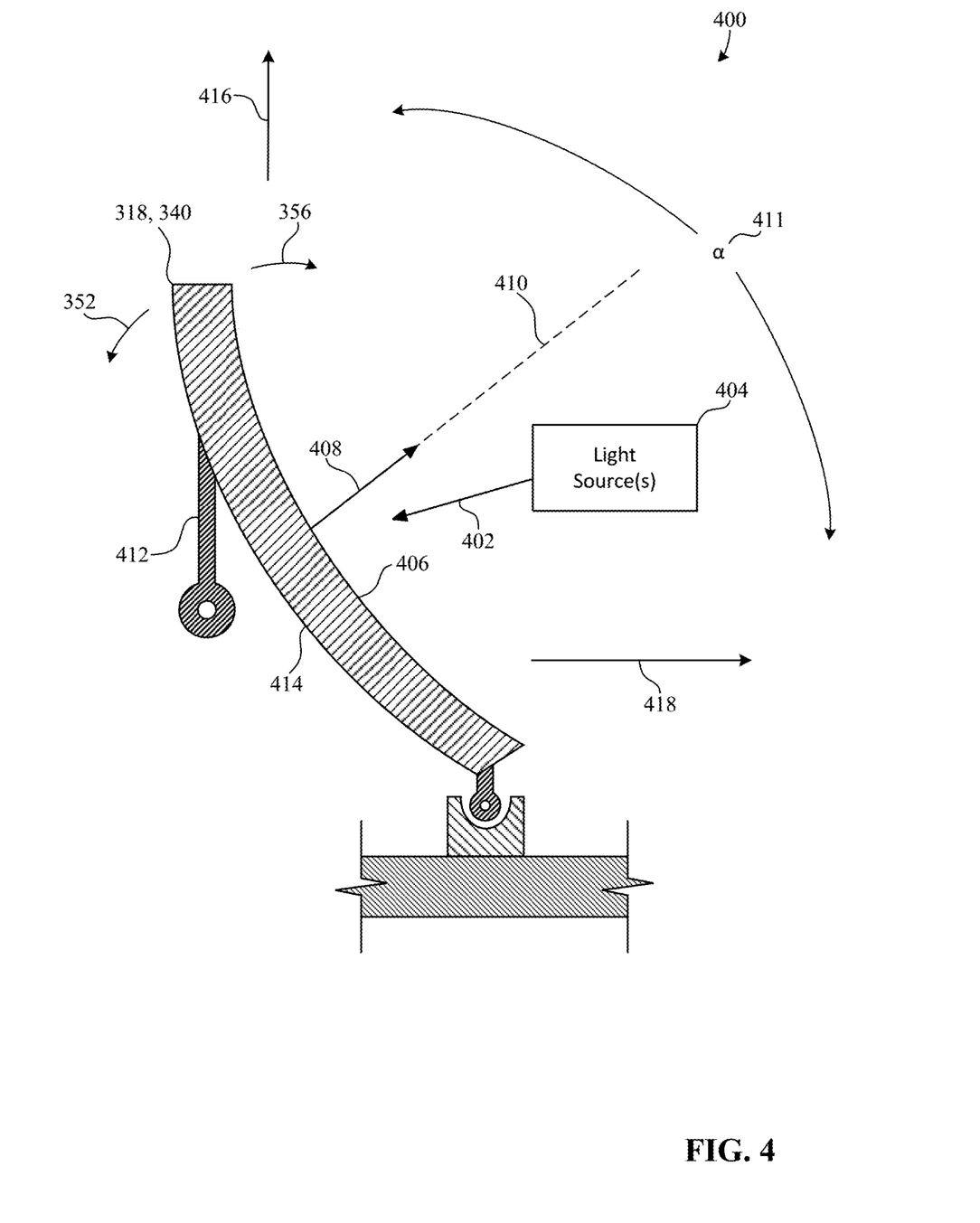
FIG. 4 is a partial cross-sectional view of the lighting assembly of FIG. 3 along line A-A and shows an example configuration of an example optical system.

FIG. 4 is a partial cross-sectional view of the lighting system 300 of FIG. 3 along line A-A and shows a first example configuration 400 of one of the optical systems 302, 304. As shown in the illustrated example of FIG. 4, the reflector 318, 340 receives a first example light beam (sometimes referred to as an incident ray) 402 that is provided by one or more example light sources (e.g., one or more LEDs, one or more light bulbs, etc.) 404 that are proximate and/or coupled to the reflector 318, 340. The first light beam 402 is emitted onto at least a portion of an example surface 406 of the reflector. As a result, the reflector 318, 340 focuses, concentrates, and/or otherwise reflects the first light beam 402 away from the surface 406. In other words, the reflector 318, 340 provides a second example light beam 408 (sometimes referred to as a reflected ray) based on the first light beam 402 that is directed substantially along a fourth axis 410, a direction of which is defined by one or more of a shape of the surface 406, an orientation of the reflector 318, 340, and/or a position of the light source(s) 404 relative to the reflector 318, 340. To facilitate directing the first light beam 402, the surface 406 may be constructed of one or more reflective materials such as aluminum, a bulk moulding compound (BMC), etc. Additionally, in some examples, the surface 406 has a shape that is curved or concave (e.g., parabolic).

As shown in FIG. 4, when the reflector 318, 340 moves in the first rotational direction 352, the second light beam 408 is aimed toward a vertical direction 416 (in the orientation of FIG. 1). Conversely, when the reflector 318, 340 moves in second rotational direction 356, the second light beam 408 is aimed toward a horizontal direction 418. In some examples, an associated lever 306, 308 and/or pivot point 310, 312 is sized, shaped, and/or otherwise configured to provide the reflector 318, 340 with a rotational range of motion (e.g., 5 degrees, 10 degrees, 15 degrees, etc.) 411 that is advantageous for vehicle beam leveling applications.

In some examples, the reflector 318, 340 includes a particular portion 412 that extends away from a side 414 of the reflector 318, 340 to receive a portion of a respective one of the lever(s) 306, 308. In such examples, this portion 412 of the reflector 318, 340 forms part of the aforementioned first joint 324.

Figure 5A:
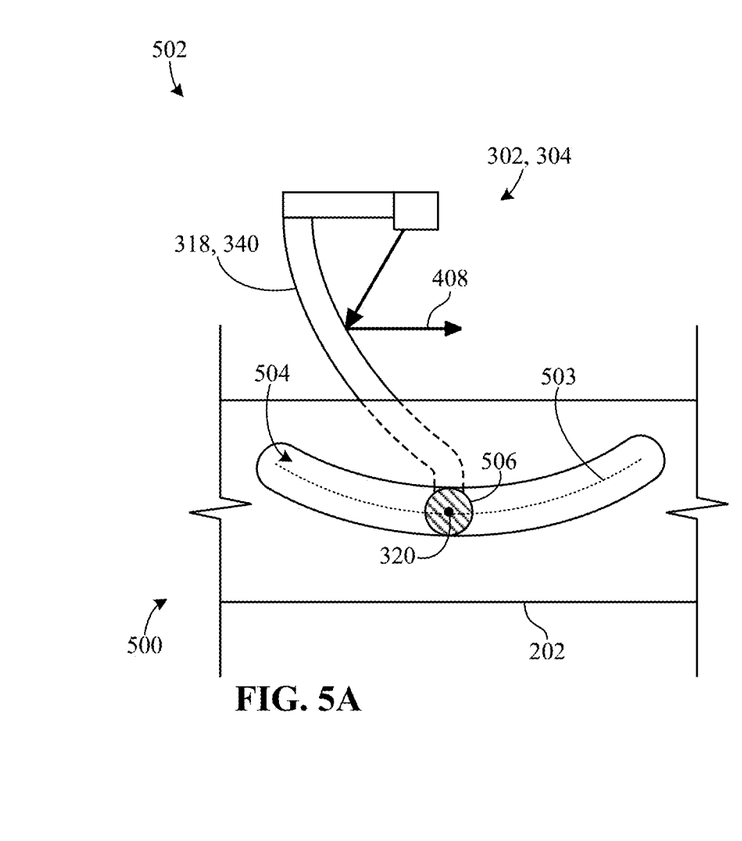
FIGS. 5A and 5B are partial views of an example optical tuning system in accordance with the teachings of this disclosure and show another example configuration of an example optical system.
Figure 5B:
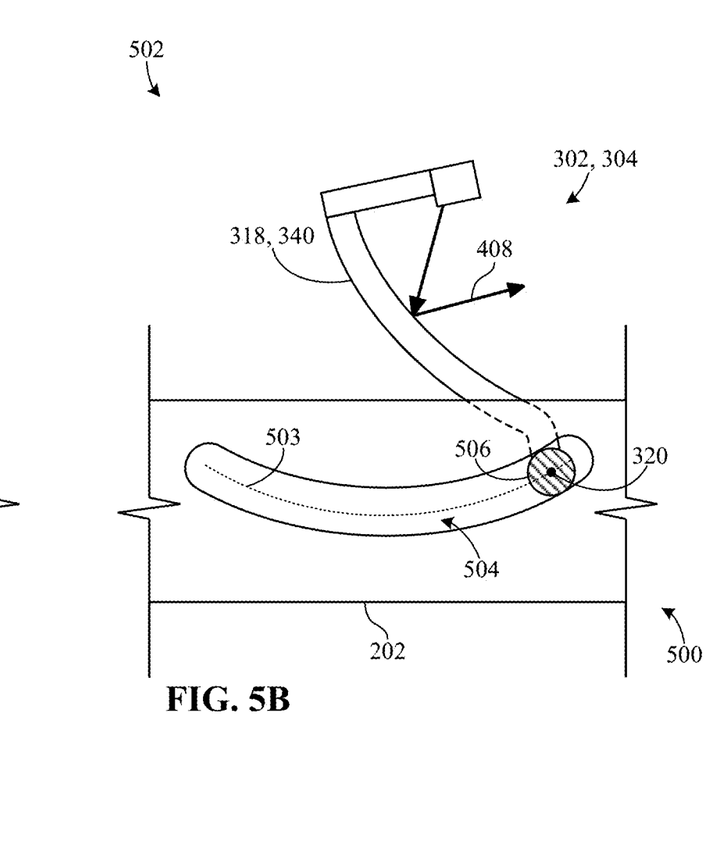

FIGS. 5A and 5B are partial cross-sectional view of an example optical tuning system 500 in accordance with the teachings of this disclosure and show a second example configuration 502 of one of the optical systems 302, 304. According to the illustrated examples of FIGS. 5A and 5B, when configured for use with the first optical system 302, the tuning system 500 enables the first reflector 318 to be adjusted relative to the first lever 306 and/or the second reflector 340. For example, when the first reflector 318 is tuned and/or otherwise adjusted via the tuning system 500, the first reflector 318 rotates relative to the first joint 324. In other words, the first reflector 318 can move while the first lever 306 is stationary. As a result, the second axis 320, about which the first reflector 318 pivots, moves along an example path 503 defined by the tuning system 500.

Similarly, when configured for use with the second optical system 304, the tuning system 500 enables the second reflector 340 to likewise be adjusted relative to the second lever 308. Thus, the tuning system 502 may be implemented with one or more (e.g., each) of the optical system(s) 302, 304 of the lighting assembly 300.

In some examples, the tuning system 502 is advantageously used to tune and/or otherwise adjust the optical system(s) 302, 304 prior to aiming light. Such tuning typically occurs during production of the vehicle lighting assembly 300 (e.g., via personnel associated with a manufacturer). However, in some examples, the optical system(s) 302, 304 can be tuned after production of the lighting assembly 300 (e.g., via personnel associated with a vehicle servicer).

In the examples of FIGS. 5A and 5B, the tuning system 500 includes a slot 504 that is configured to receive at least a portion 506 of a reflector 318, 340 and/or one or more components interposed between the reflector 318, 340 and the slot 504. The slot 504 may be formed by the housing 202 or one or more components coupled to the housing 202. In particular, the slot 504 provides the path 503 for tuning. As shown, the slot 504 has as shape that is curved (e.g., circular or semicircular) to facilitate positioning the reflector 318, 340. Accordingly, the path 503 is also curved in this example.

After tuning the reflector 318, 340 to a particular position, the reflector 318, 340 is secured to the tuning system 500 to maintain the position via one or more fasteners (e.g., a screw) and/or fastening methods or techniques (e.g., via welding, glue, etc.). In some examples, the reflector 318, 340 is fixedly coupled to the tuning system 500. However, the reflector 318, 340 may be removably or releasably coupled to the tuning system 500 to enable additional tuning.

As shown in FIG. 5A, the reflector 318, 340 is in a first tuned position provided by the tuning system 500 such that the second light beam 408 is directed horizontally. As shown in FIG. 5B, the reflector is in a second tuned position, different from the first tuned position, provided by the tuning system 500 (e.g., as a result of user manipulation of the reflector 318, 340) such that the direction of second light beam 408 and the position of the second axis 320 have changed relative to the first tuned position.

Figures 6A, 6B:
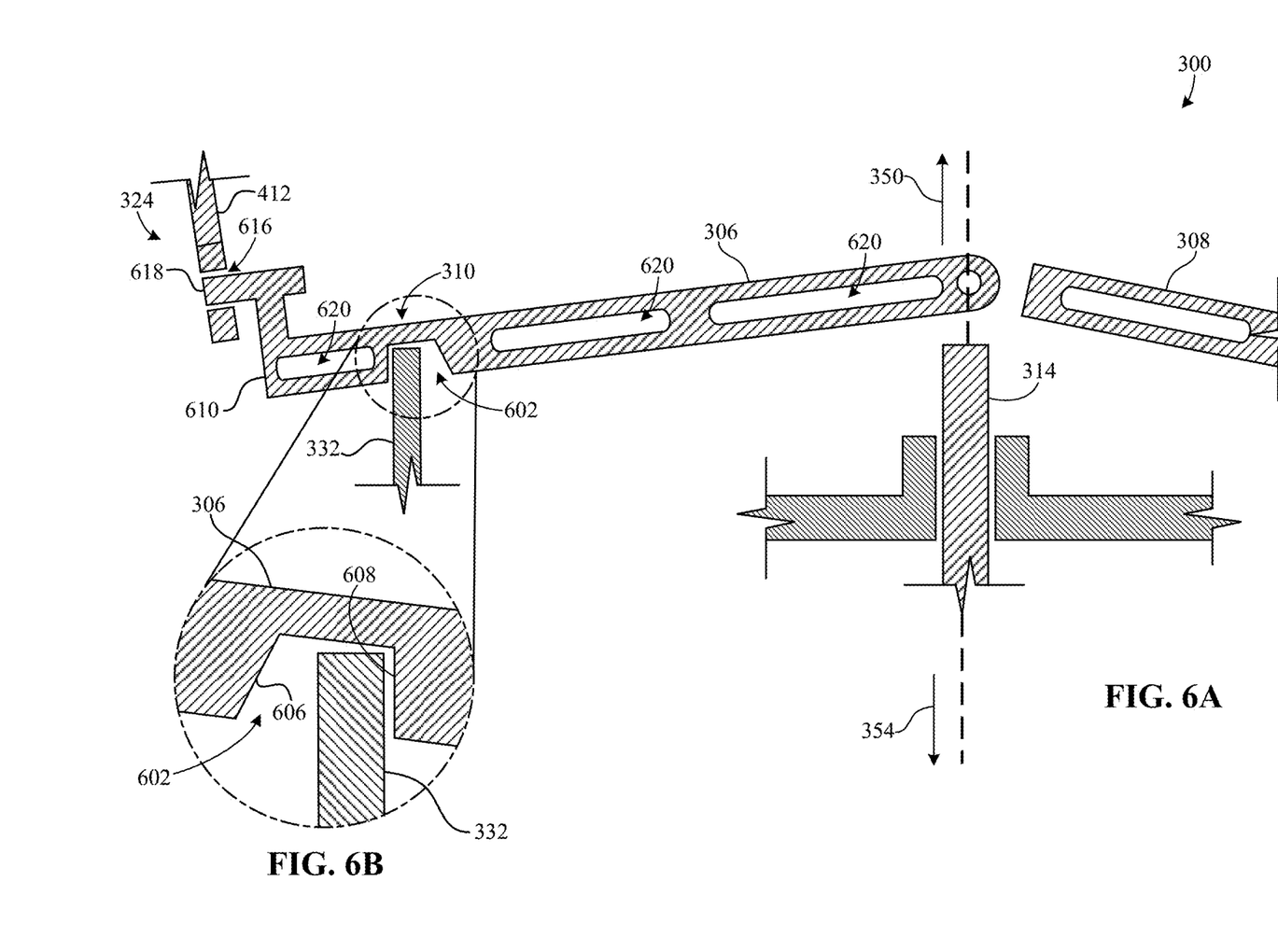
FIG. 6A is a partial cross-sectional view of the lighting assembly of FIG. 3 along line B-B and shows an example lever.
FIG. 6B is an enlarged partial-view of the example lever of FIG. 6A.

FIG. 6A is a partial cross-sectional view of the lighting assembly 300 of FIG. 3 along line B-B and shows an example receptacle 602 of the first lever 306. According to the illustrated example of FIG. 6A, the receptacle 602 is disposed on the first lever 306 and configured to receive the first protrusion 332 to provide the first pivot point 310. In particular, the receptacle 602 of FIG. 6A includes a recessed area formed by the first lever 306.

As shown in FIG. 6A, the first lever 306 is in a lowered position as a result of the adjustment part 314 being in a raised position or moved in the first linear direction 350. As shown in FIG. 6B, the first lever 306 is in a raised position as a result of the adjustment part 314 being in a lowered or moved in the second linear direction 354. In some examples, to limit movement of the first lever 306 as well as the first reflector 318, at least a portion of the second lever 306 and/or component(s) (e.g., one or more travel stops) associated therewith engage the first protrusion 322. For example, as shown in FIG. 6B, the first lever 306 includes a first side 606 formed by the receptacle 602 that engages the first protrusion 332, thereby defining the lowered position of the first lever 306. Similarly, the first lever 306 also includes a second side 608, at least partially facing the first side 606, that engages the first protrusion 332, thereby defining the raised position of the first lever 306. In this example, the receptacle 602 has a shape that is tapered.

According to the illustrated example of FIG. 6A, a portion (e.g., an end) 610 of the first lever 306 is configured to receive the portion 412 of the first reflector 318 to form the aforementioned first join 324. In particular, the first joint 324 of FIG. 6A includes a fourth aperture 616 that extends at least partially through the second adaptor to receive an example extension 618 of the first lever 306.

In some examples, the first lever 306 includes one or more recessed areas 620 (three of which are shown in FIG. 6A) to reduce weight while maintaining strength and/or rigidity of the first lever 306. Such recessed area(s) of the first lever 306 may extend entirely or partially therethrough.

Although FIGS. 6A and 6B depict aspects associated with the first lever 306 and the first reflector 318, such aspects likewise one or more other levers (e.g., the second lever 308) and/or one or more other reflectors (e.g., the second reflector 340) of the vehicle lighting assembly 300.

Figure 7:
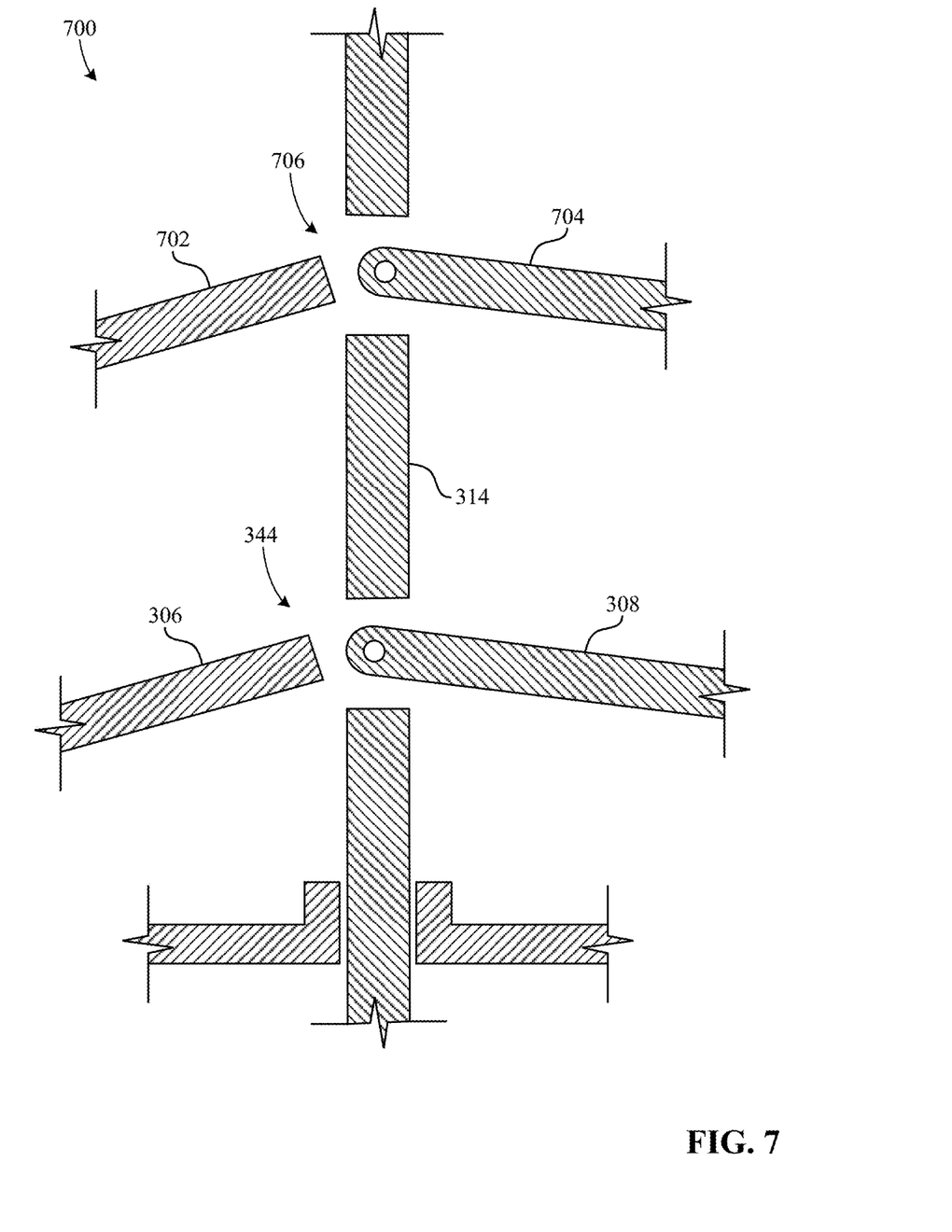
FIG. 7 is a partial cross-sectional view of an additional configuration of the lighting assembly of FIG. 3.

FIG. 7 is a partial cross-sectional view of an additional configuration 700 of the vehicle lighting assembly 300 of FIG. 3. In particular, unlike the illustrated example of FIG. 3, the primary adjustment part 314 is operatively coupled multiple (e.g., two or more) pairs of levers 306, 308, 702, 704, each of which is operatively coupled to respective pairs of optical systems (not shown). The adjustment part 314 of FIG. 7 is movably coupled to third and fourth levers 702, 704 (e.g., similar to the first and second levers 306, 308) via a fourth example joint 706 (e.g., similar to the second joint 344) that is interposed between and/or formed by the adjustment part 314 and the third and fourth levers 702, 704. Thus, as the adjustment part 314 moves in the manner previously described, each lever 306, 308, 702, 704 pivots about respective pivot points in a cooperative manner, thereby moving the respective optical systems cooperatively.

Obviously, numerous modifications and variations are possible in light of the above teachings. It is therefore to be understood that within the scope of the appended claims, the invention may be practiced otherwise than as specifically described herein.

Vehicle(s) and/or device(s) that include one or more of the features in the foregoing description provide numerous advantages. In particular, adjustable lighting apparatus disclosed herein enable control of light while reducing weight, complexity, and associated production cost. Additionally, disclosed apparatus enable horizontal arrangement of optical systems.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

What it is claimed is:

1. A vehicle lighting assembly, comprising:
   a plurality of optical systems each configured to output respective light beams;
   a primary adjustment part movable along a first axis;
   a plurality of levers each operatively coupled to (a) the primary adjustment part and (b) a respective one of the optical systems;
   a plurality of lever pivot points corresponding to respective ones of the plurality of levers, wherein movement of the adjustment part along the first axis results in cooperative movement of the plurality of optical systems; and
   a joint formed by the primary adjustment part and at least two levers of the plurality of levers.

2. The vehicle lighting assembly of claim 1, further including a tuning system configured to adjust one of the plurality of optical systems relative to a respective one of the plurality of levers.

3. The vehicle lighting assembly of claim 2, wherein the tuning system includes a slot disposed in a housing of a lighting device, the one of the plurality of optical systems having a portion that is movable in the slot.

4. The vehicle lighting assembly of claim 3, wherein the slot has a shape that is curved.

5. The vehicle lighting assembly of claim 1, wherein the plurality of optical systems includes respective reflectors, at least two of the reflectors positioned along the same horizontal axis.

6. The vehicle lighting assembly of claim 5, wherein the two reflectors pivot relative to the same horizontal axis.

7. The vehicle lighting assembly of claim 1, wherein the joint includes an aperture extending through a portion of the primary adjustment part and portions of the respective two levers to receive means for movably coupling the primary adjustment part to the two levers.

8. An apparatus, comprising:
   a housing of a vehicle lamp;
   a reflector pivotably coupled to the housing; and
   a shaft extending through the housing to engage a lever that is operatively interposed between the reflector and the shaft, the lever pivotable relative to a pivot point positioned between the reflector and the shaft, wherein the shaft moves into or out of the housing to cause the lever to move the reflector, wherein a distance between the pivot point and the reflector is less than a distance between the pivot point and the shaft.

9. The apparatus of claim 8, wherein the lever includes a receptacle to be received by a protrusion positioned in the housing that defines the pivot point, the lever to pivot relative to the protrusion between raised and lowered positions.

10. The apparatus of claim 9, wherein the receptacle has a shape that is tapered.

11. The apparatus of claim 8, wherein the reflector is a first reflector and the lever is a first lever, further including a second reflector pivotably coupled to the housing, the shaft to engage a second lever that is operatively interposed between the second reflector and the shaft to enable the second lever to move the second reflector cooperatively with the first reflector.

12. The apparatus of claim 11, further including means for adjusting an orientation of one of the first or second reflector relative to the other one of first or second reflector.

13. The apparatus of claim 8, further including a joint formed by the lever and the reflector.

14. The apparatus of claim 13, wherein the joint includes an aperture that extends through a portion of the reflector to receive a portion of the lever.

15. A vehicle, comprising:
   a lamp to emit a light;
   means for directing the light;
   a lever movably coupled to the means for directing the light to control a position thereof;
   means for moving the lever to cause (a) the lever to pivot relative to a first axis and (b) the means for directing the light to pivot relative to a second axis that is different from the first axis; and
   a tuning system configured to adjust the second axis and including a slot disposed in a housing of the lamp, the means for directing the light having a portion that is movable in the slot.

16. The vehicle of claim 15, wherein the first axis is substantially perpendicular relative to the second axis.

17. The vehicle of claim 15, wherein the means for directing the light is a first means for directing the light and the lever is a first lever, and wherein the vehicle further includes second means for directing the light and a second lever coupled thereto to control a position thereof, the means for moving to cause the first and second means for directing the light to simultaneously pivot relative to the first axis.

18. The vehicle of claim 15, wherein the slot has a shape that is curved.

* * * * *